(12) United States Patent
Dyer

(10) Patent No.: US 6,234,114 B1
(45) Date of Patent: May 22, 2001

(54) NESTING PADS FOR USE IN COMBINATION WITH POULTRY HOUSES

(76) Inventor: Stephen Dyer, 1312 County Rd. 747, Cullman, AL (US) 35058

( * ) Notice: Subject to any disclaimer, the term of this patent is extended or adjusted under 35 U.S.C. 154(b) by 0 days.

(21) Appl. No.: 09/289,893

(22) Filed: Apr. 12, 1999

(51) Int. Cl.[7] .................................................. A01K 31/10
(52) U.S. Cl. .............................................. 119/334; 119/440
(58) Field of Search ............................... 119/440, 437, 119/439, 335, 334, 336, 337

(56) References Cited

U.S. PATENT DOCUMENTS

| | | | |
|---|---|---|---|
| 792,007 | * 6/1905 | Denison | 119/334 |
| 1,911,633 | * 5/1933 | Lohrer | 119/337 |
| 3,507,010 | * 4/1970 | Daleman et al. | |
| 4,364,332 | * 12/1982 | Smith | 119/337 |
| 4,516,532 | * 5/1985 | Rafaeli | 119/334 |
| 5,174,242 | * 12/1992 | Takeuchi | 119/439 |
| 5,365,878 | * 11/1994 | Dyer | 119/347 |
| 5,660,145 | * 8/1997 | Rumbaugh | 119/440 |

* cited by examiner

*Primary Examiner*—Charles T. Jordan
*Assistant Examiner*—Judith A. Nelson
(74) *Attorney, Agent, or Firm*—Robert J. Veal; Robert M. Jackson; Burr & Forman LLP

(57) ABSTRACT

An improved nesting pad for use in poultry houses with bays for egg laying poultry utilizing an extension portion to extend over an associated egg gathering conveyor to maintain the vertical relation between the pad and the conveyor such that the conveyor is below the pad, thereby assuring that eggs and debris will pass from the nesting pad onto the conveyor rather than under the conveyor. The pad and extension may be unitary or may be formed separately and cooperatively inserted into the bays.

14 Claims, 3 Drawing Sheets

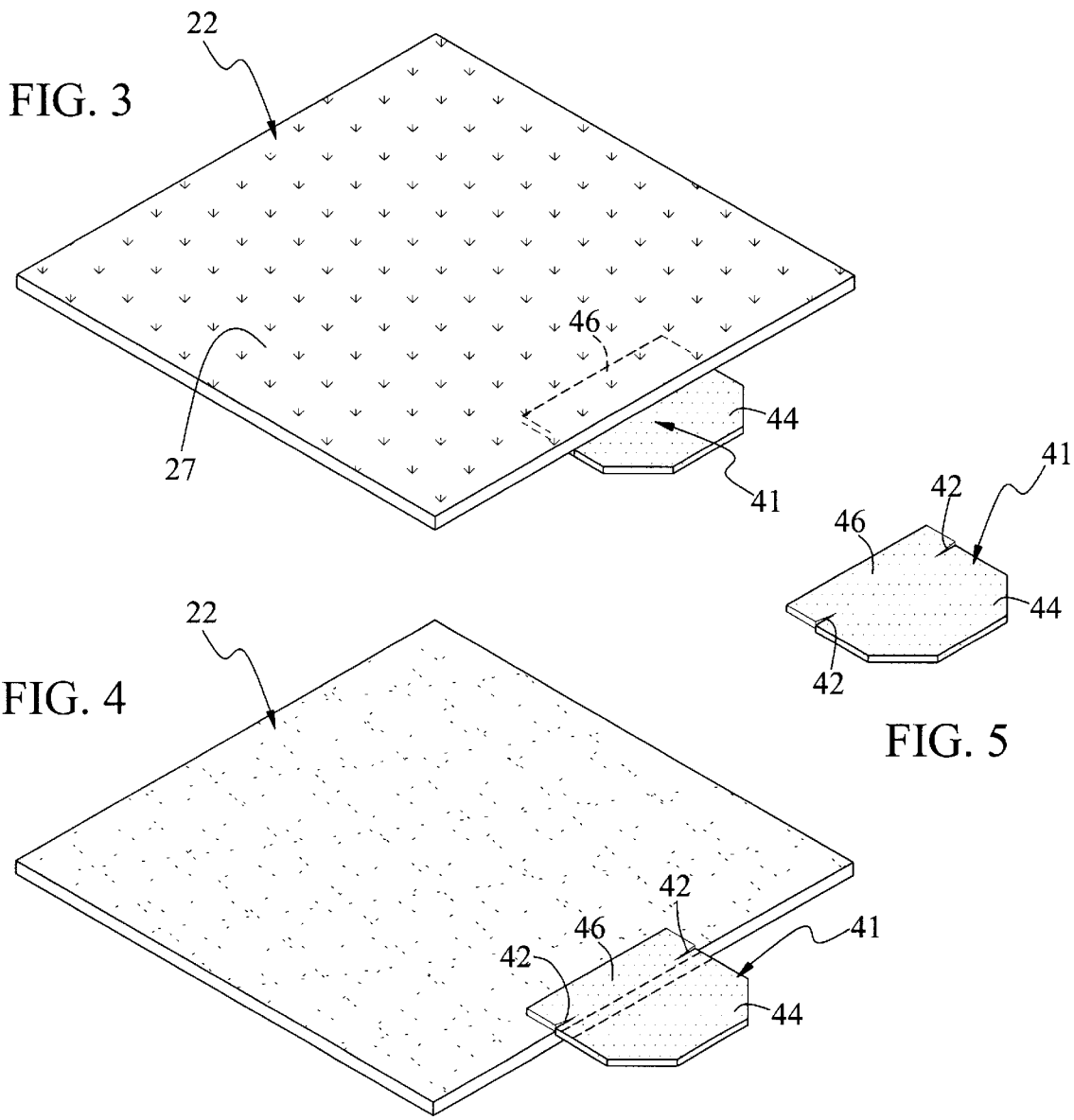

NESTING PADS FOR USE IN COMBINATION WITH POULTRY HOUSES

BACKGROUND OF THE INVENTION

The present invention relates to nesting pads used in poultry confinement buildings by poultry breeders and egg producers. More particularly, this invention relates to nesting pads for egg laying hens. In even greater particularity, the invention relates to a nesting pad shaped to fit within conventional hen houses.

Poultry breeders and egg producers have utilized nesting pads to promote egg laying by hens in their poultry confinement structures. Straw was commonly used in the past as a nesting material. Over the years, the poultry industry has grown to utilize larger and more sophisticated structures for poultry confinement. Breeders and producers found that straw was detrimental to keeping these confinement structures clean. New nesting materials were tested or developed for use within the larger confinement structures. The new nesting materials include rubber mats, non-woven mats, carpet pads, plastic pads and Astro Turf® pads such as the pad disclosed shown in U.S. Pat. No. 3,507,010. The alternative nesting materials are useful in many respects but also present some disadvantages. Some of those disadvantages have been addressed in U.S. Pat. No. 5,365,878 wherein a new nesting pad was disclosed; however, additional disadvantages arise through the use of the turf pads and the like in conjunction with an egg gathering conveyor. Such conveyors run longitudinally within the house adjacent the nests and receive eggs from each nest. Oftentimes, the belt of the conveyor becomes displaced or rides up to a height such that an egg cannot exit the nest onto the belt under the influence of gravity. Additionally, when a laying hen dies in the nest, the hen is often found with one foot caught under the belt. Oftentimes, the belt must be stopped and the bay disassembled to gain access to the belt to clean it. Likewise, debris of various natures from the nests may lodge under the belt creating uneven running and potential contamination.

There is a continuing need in the poultry industry for a nesting pad which can support delicate eggs, is cleanable, and can be readily engaged with the belt conveyor to relieve the aforementioned problems. The pads must also be adapted for use within existing poultry confining structures. Some of these problems have been heretofore addressed in the prior art; however, there has not been an economical and effective nest introduced in the past several years.

DESCRIPTION OF THE DRAWINGS

A nesting pad embodying features of my invention is depicted in the accompanying drawings, wherein:

FIG. 3 is a top perspective view of the improved nest in a second embodiment;

FIG. 4 is a bottom perspective view of the improved nest in a second embodiment; and, FIG. 5 is a perspective view of the flange member of the second embodiment.

DESCRIPTION OF THE PREFERRED EMBODIMENTS

Figure 1:
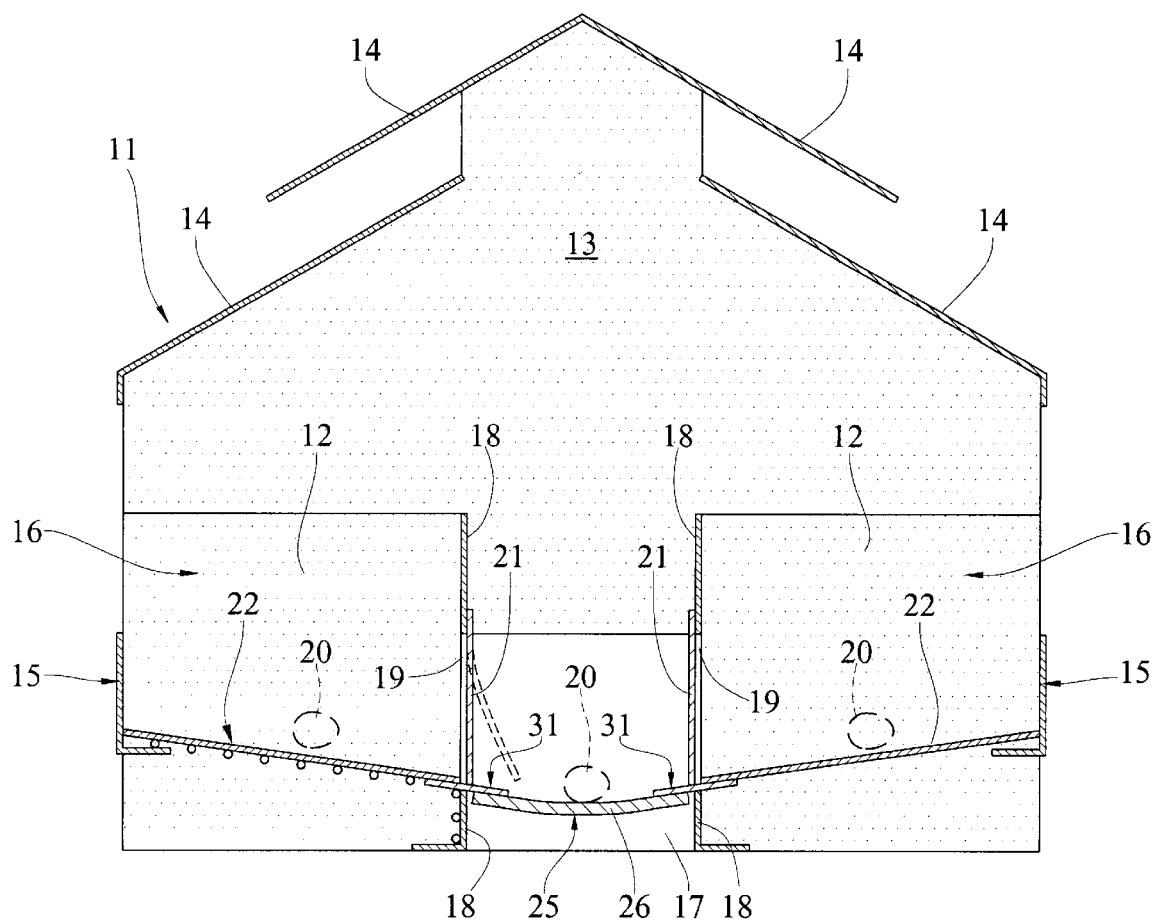
FIG. 1 is a sectional view through a laying house wherein the relationship between the nest and an egg gathering conveyor is depicted.
Figure 2:
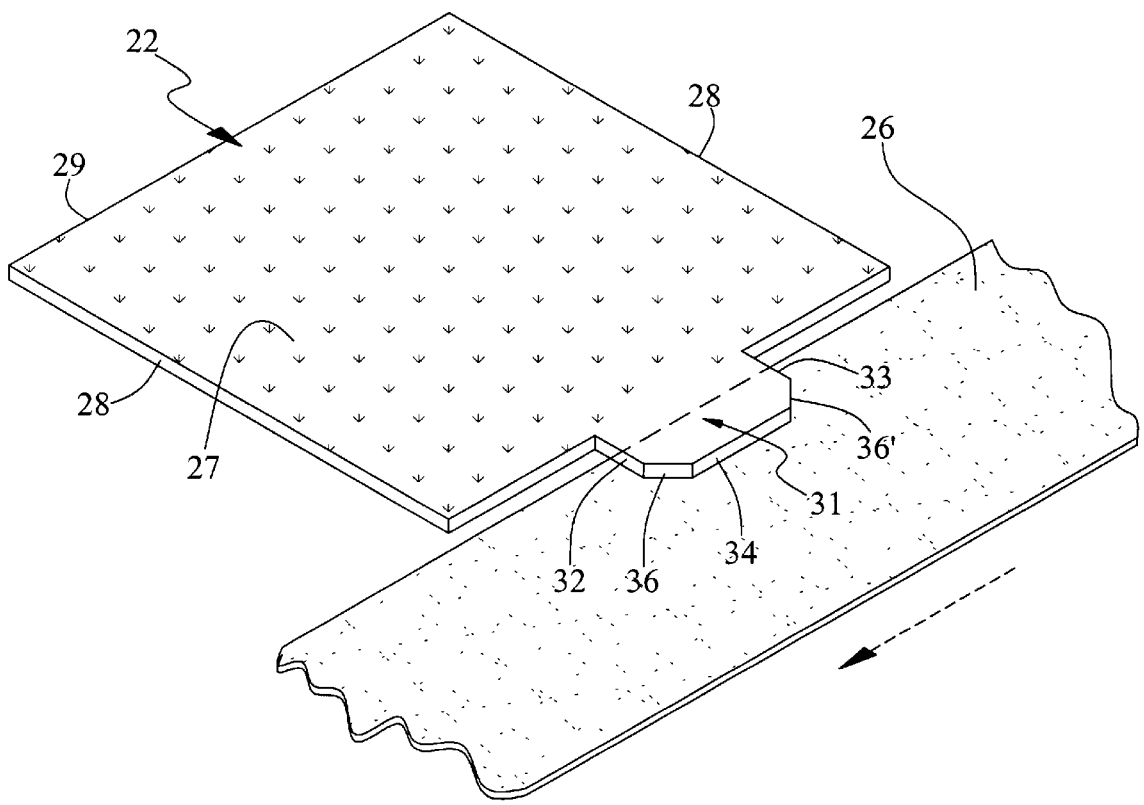
FIG. 2 is a perspective view of the improved nest in one embodiment.

Referring to the drawings for a clearer understanding of the invention, FIG. 1 shows a poultry confinement structure indicated generally by reference numeral 11. The structure 11 comprises a plurality of partitions 12 and end walls 13 with a roof 14. The partitions 12 define a plurality of bays 16 which house the laying hens (not shown). A pair of sidewalls 15 extend longitudinally connecting end wall 13 and defining an access port for the bays. The structure 11 has a chute 17 defined by interior walls 18 between the plurality of to bays 16. In most embodiments the chute 17 acts as a bottom for a powered egg gathering conveyor 25 in the form of a belt conveyor with belt 26 having a width extending substantially across the chute 17. It can be seen that a plurality of openings 19 connect each bay 16 with the chute 17. Semi-rigid flaps 21 may depend from interior walls 18 to restrict access between the bays and the chute and cover the openings 19 as shown in FIG. 2. The semi-rigid flaps 21 maybe rubber, plastic, or any flexible material which would allow an egg 20 to pass from the bay 16 to the chute 17. A nesting pad 22 is shown resting on a floor in each bay 16. The nesting pad 22 may be supported on a wire floor, a slat floor or a panel floor and either of the new nesting materials including rubber mats, non-woven mats, carpet pads, plastic pads and Astro Turf® pads.

In the first embodiment the present pads 22 include an upper surface 27 and side 28 and end 29 dimensions substantially equivalent to those found in the bay. Extending from one end 28 of the mat is a flange 31 which is the same width as opening 19. Flange 31 may be integrally formed on the mat 22, may be adhered to the mat with a suitable adhesive, thermally bonded to the mat, or spot welded by localized heating of the plastic such that the mat 22 and flange are held in cooperative relationship with one another. The mat 22 is positioned in bay 17 with flange 31 extending through opening 19 and overlying the top of belt 26 of the egg gathering conveyor. Flange 31 has a leading and trailing edge 32, 33 and a terminal edge 34 joined to the leading and trailing edges 32, 33 by a beveled section 36, 36', such that the pad may be easily positioned with the flange in opening 19.

It may be seen that with flange 31 positioned on top of conveyor belt 26, the belt is constrained to move at a level which permits the eggs from the bay to roll out of opening 19. Likewise, debris from the bay is carried over the flange onto the top of the belt and carried away by the belt. In the same manner when a hen expires in the bay the belt prevents entanglement of the leg or feet of the bird beneath the belt. Accordingly, this simple improvement yields a significant improvement in laying production by:

1. Increasing the percentage of the laid eggs which exit the bay onto the belt in a timely manner;
2. Reducing the wear, fatigue, and contamination caused by general debris accumulating under the egg gathering belt; and,
3. Preventing bird entanglement with the belt, thereby diminishing the down time of the belt conveyor.

These advantages may be realized with some existing pads if the second embodiment of the invention is employed. In this embodiment, a separate flange 41 made from a suitable polymeric material is utilized as the retrofit member. Flange 41 is formed similarly to flange 31 except that it is separate from the pad and its width is greater than the width of opening 19. The flange is held in place by engagement of the sheet metal on either side of opening 19 in a pair of transverse slits 42 formed in the side edges of flange 41. A first portion 44 of flange 41 extends into chute 17 overlying belt 25 and a second portion 46 of flange 41 extends into the bay beneath pad 22 such that eggs are guided to the belt 26 and the belt is kept free of underlying contamination.

With either embodiment the producer is assured of increased efficiency of his operation. While I have shown my invention in two forms only, it is to be understood that the embodiments are presented for illustration and not limitation, and that the invention is susceptible to various changes and improvements which do not vary the scope of the appended claims.

What I claim is:

1. A nesting pad for use in combination with poultry houses, said poultry houses comprising:

a plurality of nesting bays each having a floor and an exterior wall with an outlet opening in said wall accessible to an egg gathering conveyor;

said nesting pad comprising of a first portion shaped to fit within any one of the said bays with at least a portion of said first portion capable of resting on said floor to provide a contiguous nesting area within said bay for a laying hen; and a second portion shaped to fit through said opening and overlie said egg gathering conveyor to maintain said second portion at a height parallel above and continuous with said egg conveyor.

2. A nesting pad as defined in claim 1 wherein said first portion is bounded by side edges and end edges with said second portion extending from one of said edges.

3. A nesting pad as defined in claim 1 wherein said first portion is integral with said second portion.

4. A nesting pad as defined in claim 1 wherein said pad is made from a material selected from the group consisting of rubber mats, non-woven mats, carpet pads, plastic pads, and wire mesh pads covered with a polymer or rubber coating.

5. A nesting pad as defined in claim 1 wherein said first and second portions are formed separately and affixed to one another for cooperative insertion within said bay.

6. A nesting pad as defined in claim 5 wherein said first portion overlies said second portion within said bay.

7. A nesting pad as defined in claim 6 wherein said second portion has a slit formed on each side thereof in opposition such that said slits are separated by distance slightly less than the width of said opening and said second portion having a width adjacent said slits greater than the width of said opening.

8. A nesting pad made from a material selected from the group consisting of rubber mats, non-woven mats, carpet pads, plastic pads, and wire mesh pads covered with a polymer or rubber coating for use in combination with poultry houses defined by a plurality of nesting bays each having a floor and an exterior wall with an outlet opening in said wall to an egg conveyor, said nesting pad comprising in combination therewith:

a first portion shaped to fit within said bay with at least a portion of said first portion resting on said floor to provide a nesting area within said bay for a laying hen; and, a second portion, integral with said first portion extending through said opening and overlaying said egg conveyor to maintain said first portion at a height above and contiguous with said egg conveyor wherein said first portion is bounded by side edges and end edges with said second portion extending from one of said edges and wherein said second portion has a width slightly less than the width of said opening.

9. A nesting pad for use in combination with poultry houses, said poultry houses defined by a plurality of nesting bays each having a floor and an exterior wall with an opening in said wall to an egg gathering conveyor, wherein said nesting pad further comprises in combination therewith:

a first portion shaped to fit within said bay with at least a portion of said first portion resting on said floor to provide a nesting area within said bay for a laying hen; and, a second portion extending through said opening and overlying said egg gathering conveyor to maintain said first portion at a height above and contiguous with said egg gathering conveyor and secured within said opening of said bay with said first portion overlying said second portion within said bay.

10. A nesting pad as defined in claim 9 wherein said second portion has a slit formed on each side thereof in opposition such that said slits are separated by distance slightly less than the width of said opening and said second portion having a width adjacent said slits greater than the width of said opening.

11. A nesting pad as defined in claim 9 wherein said pad is made from a material selected from the group consisting of rubber mats, non-woven mats, carpet pads, plastic pads, and wire mesh pads covered with a polymer or rubber coating.

12. A nesting pad as defined in claim 9 wherein said first and second portion are formed separately and affixed to one another for cooperative insertion within said bay.

13. A nesting pad as defined in claim 1, 8, or 9 wherein said second portion has a leading and trailing edge and a terminal edge joined to the leading and trailing edges by an angled section.

14. A nesting pad as defined in claim 1, 8 or 9 wherein said first portion has a lower surface with dimensions substantially equivalent to said floor.

* * * * *